US012571330B2

(12) United States Patent
Binek et al.

(10) Patent No.: US 12,571,330 B2
(45) Date of Patent: Mar. 10, 2026

(54) OIL NOZZLE FOR BEARING CHAMBER

(71) Applicant: RTX Corporation, Farmington, CT (US)

(72) Inventors: Lawrence A. Binek, Glastonbury, CT (US); Christopher D. Ramsey, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 124 days.

(21) Appl. No.: 18/493,479

(22) Filed: Oct. 24, 2023

(65) Prior Publication Data

US 2024/0141803 A1 May 2, 2024

Related U.S. Application Data

(60) Provisional application No. 63/420,045, filed on Oct. 27, 2022.

(51) Int. Cl.
| | |
|---|---|
| *F01D 25/18* | (2006.01) |
| *B05B 1/14* | (2006.01) |
| *B05B 15/60* | (2018.01) |
| *B05B 15/65* | (2018.01) |
| *F01D 25/12* | (2006.01) |
| *F01M 1/08* | (2006.01) |
| *F16C 33/66* | (2006.01) |

(Continued)

(52) U.S. Cl.
CPC ................ *F01D 25/18* (2013.01); *B05B 1/14* (2013.01); *B05B 15/60* (2018.02); *B05B 15/65* (2018.02); *F01D 25/125* (2013.01); *F01M 1/08* (2013.01); *F16C 33/6659* (2013.01); *F16N 7/34* (2013.01); *F16N 21/04* (2013.01)

(58) Field of Classification Search
CPC ........... B05B 1/14; B05B 15/60; B05B 15/65; F01D 25/18; F01M 1/08; F16N 7/34; F16N 21/04; F16C 33/6659
See application file for complete search history.

(56) References Cited

U.S. PATENT DOCUMENTS

| | | | |
|---|---|---|---|
| 2,964,248 A | 12/1960 | O'Brien et al. | |
| 7,063,049 B2 * | 6/2006 | Kemp ...................... | F01M 1/08 |
| | | | 123/196 R |

(Continued)

FOREIGN PATENT DOCUMENTS

| | | |
|---|---|---|
| EP | 3254764 A1 | 12/2017 |
| EP | 3904644 A2 | 11/2021 |

OTHER PUBLICATIONS

Search Report issued in European Patent Application No. 23206248.9; Application Filing Date Oct. 26, 2023; Date of Mailing Mar. 20, 2024 (6 pages).

*Primary Examiner* — Kyle Robert Thomas
(74) *Attorney, Agent, or Firm* — CANTOR COLBURN LLP

(57) ABSTRACT

A bearing chamber is provided. The bearing chamber includes an interior surface comprising a terminal block defining a keyway and a conduit terminating at the keyway and an oil nozzle defining an internal channel. The oil nozzle includes a base tightly fittable in the keyway. When the base is tightly fit in the keyway, the internal channel is communicative with the conduit and an orientation of the keyway and a configuration of the oil nozzle are cooperatively established to aim the oil nozzle at a predefined target within the bearing chamber.

19 Claims, 5 Drawing Sheets

(51) Int. Cl.
    *F16N 7/34*           (2006.01)
    *F16N 21/04*         (2006.01)

(56)             References Cited

U.S. PATENT DOCUMENTS

| | | | |
|---|---|---|---|
| 8,074,901 B2 * | 12/2011 | Cotler | ..................... F16N 7/34 |
| | | | 239/501 |
| 8,201,389 B2 * | 6/2012 | Eleftheriou | ............ F01D 25/18 |
| | | | 60/39.08 |
| 11,230,946 B2 | 1/2022 | Davis et al. | |
| 2008/0083227 A1 | 4/2008 | Eleftheriou et al. | |
| 2022/0389872 A1 * | 12/2022 | Smith | ..................... F02C 7/222 |

* cited by examiner

| 601 | Additively manufacturing bearing chamber |
|---|---|
| 602 | Additively manufacturing oil nozzle with bearing chamber |

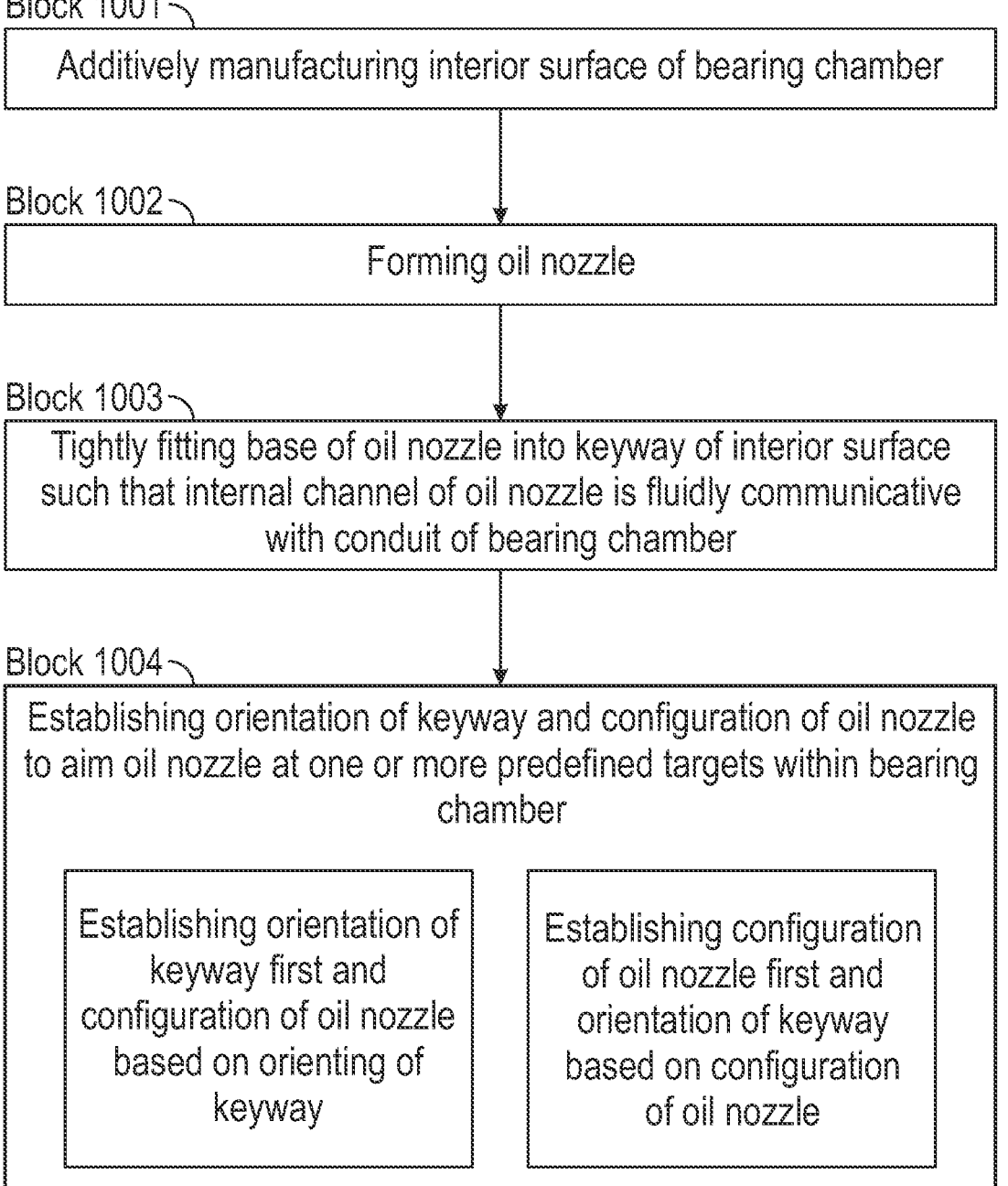

Block 1001

Additively manufacturing interior surface of bearing chamber

Block 1002

Forming oil nozzle

Block 1003

Tightly fitting base of oil nozzle into keyway of interior surface such that internal channel of oil nozzle is fluidly communicative with conduit of bearing chamber Block 1004

Establishing orientation of keyway and configuration of oil nozzle to aim oil nozzle at one or more predefined targets within bearing chamber Establishing orientation of keyway first and configuration of oil nozzle based on orienting of keyway Establishing configuration of oil nozzle first and orientation of keyway based on configuration of oil nozzle

FIG. 10

OIL NOZZLE FOR BEARING CHAMBER

CROSS-REFERENCE TO RELATED APPLICATIONS

This application claims the benefit of U.S. Provisional Application No. 63/420,045 filed Oct. 27, 2022, the disclosure of which is incorporated herein by reference in its entirety.

BACKGROUND

Exemplary embodiments of the present disclosure relate generally to gas turbine engines and, in one embodiment, to an oil nozzle for a bearing chamber of a gas turbine engine.

In a gas turbine engine, air is compressed in a compressor and compressor air is then mixed with fuel and combusted in a combustor to produce a high-temperture and high-pressure working fluid. This working fluid is directed into a turbine in which the working fluid is expanded to generate power. The generated power drives the rotation of a rotor within the turbine through aerodynamic interactions between the working fluid and turbine blades or airfoils. The rotor can be used to drive rotations of a propeller or to produce electricity in a generator.

Certain parts, such as a bearing chamber, in a gas turbine engine need a supply of oil for cooling. In conventional systems, this oil is supplied via individual, single-stream nozzles. A problem with the conventional individual, single-stream nozzles is that they are expensive and require significant numbers of additional parts for fastening each of the individual, single-stream nozzles in place.

Accordingly, a need exists for improved oil distribution in a bearing chamber of a gas turbine engine.

BRIEF DESCRIPTION

According to an aspect of the disclosure, a bearing chamber is provided. The bearing chamber includes an interior surface comprising a terminal block defining a keyway and a conduit terminating at the keyway and an oil nozzle defining an internal channel. The oil nozzle includes a base tightly fittable in the keyway. When the base is tightly fit in the keyway, the internal channel is communicative with the conduit and an orientation of the keyway and a configuration of the oil nozzle are cooperatively established to aim the oil nozzle at a predefined target within the bearing chamber.

In accordance with additional or alternative embodiments, the interior surface and the terminal block are additively manufactured.

In accordance with additional or alternative embodiments, the keyway and the base are each elongate.

In accordance with additional or alternative embodiments, the base includes a fastening point at which the base is fastened to the terminal block at the keyway.

In accordance with additional or alternative embodiments, an opening of the internal channel sits flush against a terminus of the conduit.

In accordance with additional or alternative embodiments, the oil nozzle includes a main section defining the internal channel, a main nozzle section coupled to the main section and defining a main nozzle internal channel communicative with the internal channel and an aperture at a distal end thereof and an additional nozzle section split off from the main nozzle section and defining an additional nozzle internal channel communicative with the main nozzle internal channel and an aperture at a distal end thereof.

In accordance with additional or alternative embodiments, the main nozzle section and the additional nozzle section point in different directions.

In accordance with additional or alternative embodiments, at least one of the main nozzle section and the additional nozzle section includes grooves at the corresponding aperture.

In accordance with additional or alternative embodiments, at least one of the main nozzle section and the additional nozzle section includes rifling at the corresponding aperture.

In accordance with additional or alternative embodiments, the main nozzle section and the additional nozzle section have different aperture configurations.

In accordance with additional or alternative embodiments, a proximal end of the additional nozzle section includes a sharp turn.

In accordance with additional or alternative embodiments, another additional nozzle section is split off from the main nozzle section.

In accordance with additional or alternative embodiments, another additional nozzle section is split off from the additional nozzle section.

In accordance with additional or alternative embodiments, the oil nozzle includes a main section defining the internal channel, a main nozzle section coupled to the main section and defining a main nozzle internal channel communicative with the internal channel and an aperture at a distal end thereof and multiple additional nozzle sections, each of which is split off from the main nozzle section and each of which defines an additional nozzle internal channel communicative with the main nozzle internal channel and an aperture at a distal end thereof.

In accordance with additional or alternative embodiments, the main nozzle section and each of the multiple additional nozzle sections point in different directions.

In accordance with additional or alternative embodiments, the oil nozzle includes a main section defining the internal channel, a main nozzle section coupled to the main section and defining a main nozzle internal channel communicative with the internal channel and an aperture at a distal end thereof through, an additional nozzle section split off from the main nozzle section and another additional nozzle section split off from the additional nozzle section, each of the additional nozzle section and the another additional nozzle section defining an additional nozzle internal channel communicative with the main nozzle internal channel and an aperture at a distal end thereof.

In accordance with additional or alternative embodiments, the main nozzle section, the additional nozzle section and the another additional nozzle section point in different directions.

According to an aspect of the disclosure, a method of additively manufacturing a bearing chamber is provided. The method includes additively manufacturing an interior surface comprising a terminal block defining a keyway and a conduit terminating at the keyway, forming an oil nozzle defining an internal channel and comprising a base, tightly fitting the base in the keyway such that the internal channel is communicative with the conduit and establishing an orientation of the keyway and a configuration of the oil nozzle to aim the oil nozzle at a predefined target within the bearing chamber.

In accordance with additional or alternative embodiments, the establishing of the orientation of the keyway is set first and the configuration of the oil nozzle is based on the orientating of the keyway.

In accordance with additional or alternative embodiments, the establishing of the the the configuration of the oil nozzle is set first and the orientation of the keyway is based on the configuration of the oil nozzle.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike:

FIG. 10 is a flow diagram illustrating a method of additively manufacturing a bearing chamber in accordance with embodiments.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
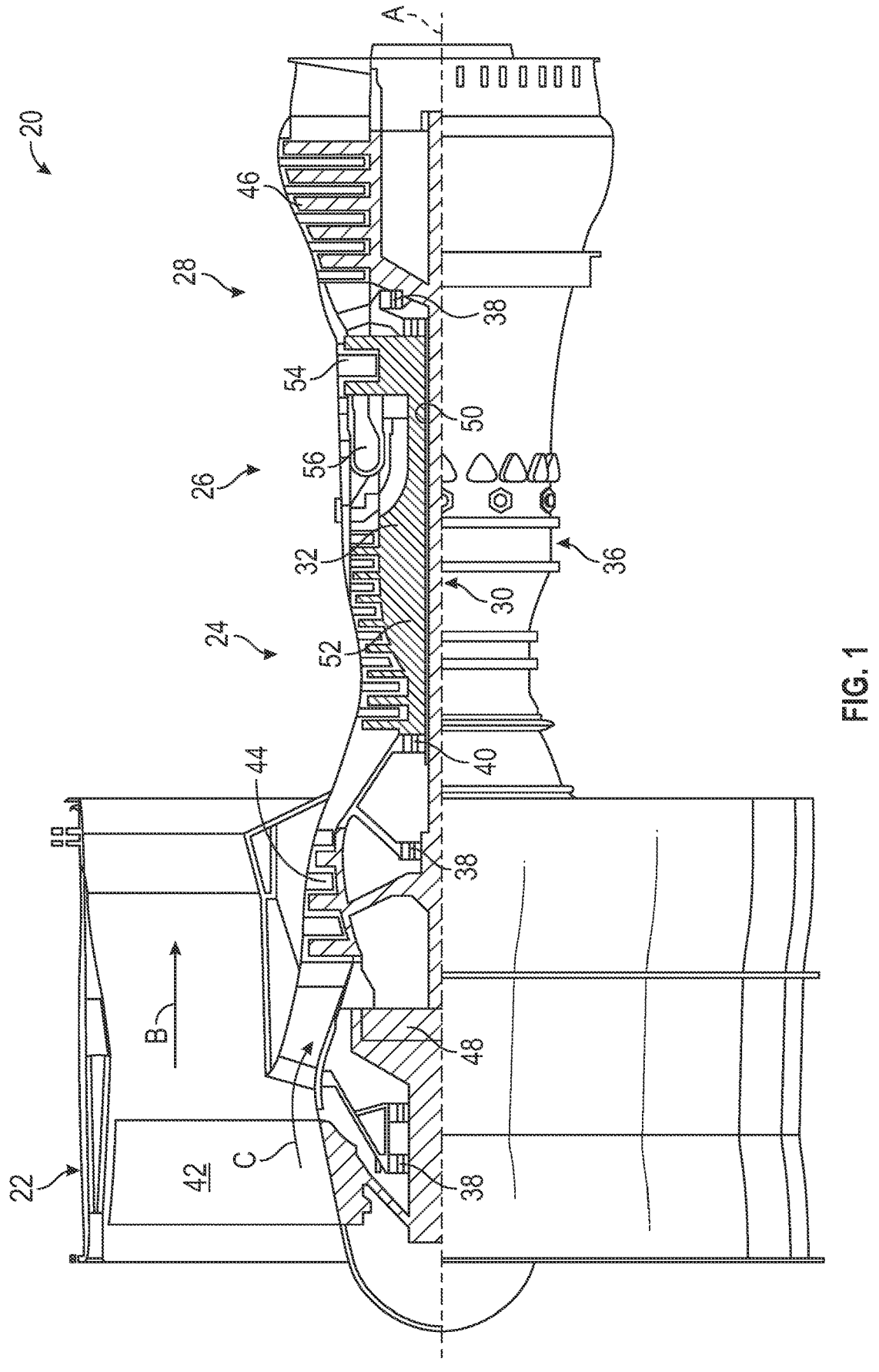
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

Within the gas turbine engine 20, bearings are used to provide smooth relative rotation between the various shafts and non-rotating components and/or between two shafts which rotate at different speeds. An oil lubrication system can be provided that includes an oil pump, sometimes referred to as a main pump, and a network of conduits and nozzles to feed the bearings with oil. This oil is contained in bearing cavities, typically formed inside annular bearing chambers. A scavenge system having one or more scavenge lines extending from the bearing chambers and one or more scavenge pumps can be used to recover the oil, which can be in the form of an oil foam at that stage. Air/oil separation and filtering is typically provided for before returning the processed oil to the bearings.

In the bearing chambers, air and oil flows mix and generate a flow pattern about the engine central longitudinal axis A. The oil flow pattern generally operates as follows: Oil particles coalesce along internal bearing chamber partitions and form a liquid partition film which contains air bubbles. In the radial space between the rotating shaft and the liquid oil film, a mixture of air and dispersed oil particles swirl in a circumferential direction at a velocity greater than the liquid oil film flow along the partitions. As a result, the oil film flow is exposed to high shear stresses at the air/oil film interface. Film thickness and velocity distributions inside the bearing are driven by the magnitude of that interfacial shear and superimposed effects of gravitational forces.

To achieve bearing chamber functionality, air and oil flows are discharged to an oil scavenge system which communicates with the oil sump and which is partially formed within the bearing chamber.

As will be described below, a bearing chamber and an oil nozzle of the gas turbine engine 20 of FIG. 1 are provided. The bearing chamber can include a terminal block defining a keyway. The oil nozzle can be fit into the keyway. The oil nozzle can be bifurcated with a main nozzle section and an additional nozzle section that splits off from the main nozzle section. The main and additional nozzle sections each have an aperture with grooves or rifling. They can be directed in different directions (i.e., with different attitudes, altitudes, etc.). Additional bifurcations are possible to either the main section or the additional nozzle section.

With continued reference to FIG. 1 and with additional reference to FIG. 2 and FIGS. 3A, 3B and 3C, an oil nozzle 201 is provided for use with a bearing chamber of the gas turbine engine 20 of FIG. 1. The oil nozzle 201 can be additively manufactured and can be connected to or fit into an interior surface of the bearing chamber as will be described below.

In any case, the oil nozzle 201 includes a main section 210 defining an internal channel 211, a main nozzle section 220 and an additional nozzle section 230. The main nozzle section 220 is coupled to the main section 210 and is formed to define a main nozzle internal channel 221 that is fluidly communicative with the internal channel 211 and an aperture 222 at a distal end thereof. A fluid, such as oil for lubricating and cooling the bearing chamber, can be flown into the internal channel 211 and at least a portion of the fluid can be directed from the internal channel 211 to the main nozzle internal channel 221. From there, the fluid exits the main nozzle internal channel 221 via the aperture 222. The additional nozzle section 230 is split off from the main nozzle section 220 and is formed to define an additional nozzle internal channel 231 that is fluidly communicative with the main nozzle internal channel 221 and an aperture 232 at a distal end thereof. A remaining portion of the fluid can be directed from the main nozzle internl channel 221 to the additional nozzle internal channel 231 so as to exit from the additional nozzle internal channel 231 via the aperture 232. In accordance with embodiments, the additional nozzle section 230 can have a sharp turn 233 at a proximal end thereof neer the split.

Figures 2, 3A, 3B, 3C, 4:
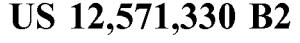
FIG. 2 is a perspective view of an oil nozzle for a bearing chamber of a gas turbine engine in accordance with embodiments.
FIG. 3A is a cutaway perspective view of the oil nozzle of FIG. 2 in accordance with embodiments.
FIGS. 3B and 3C are enlarged side views of the portion of FIG. 3A encircled by dashed line 3-3 in accordance with embodiments.
FIG. 4 is a perspective view of an oil nozzle for a bearing chamber of a gas turbine engine in accordance with further embodiments.

As shown in FIG. 2, the main nozzle section 220 and the additional nozzle section 230 point in different directions with different attitudes, altitudes, etc., so that they each direct fluid toward different particular targets (i.e., sections of the bearing chamber which are particularly in need of cooling and lubrication).

As shown in FIGS. 3B and 3C, at least one of the main nozzle section 220 and the additional nozzle section 230 includes grooves 301 (see FIG. 3B) or rifling 302 (see FIG. 3C) at the corresponding aperture 222/232. This serves to increase control of the flow of the fluid exiting the aperture 222/232 and to thereby improve an ability of the at least one of the main nozzle section 220 and the additional nozzle section 230 to aim the fluid in the respective different directions. In accordance with further embodiments, it is to be understood that the apertures 222/232 need not have similar configurations and can, in certain cases, have differing aperture configurations from one another.

Figures 5, 6:
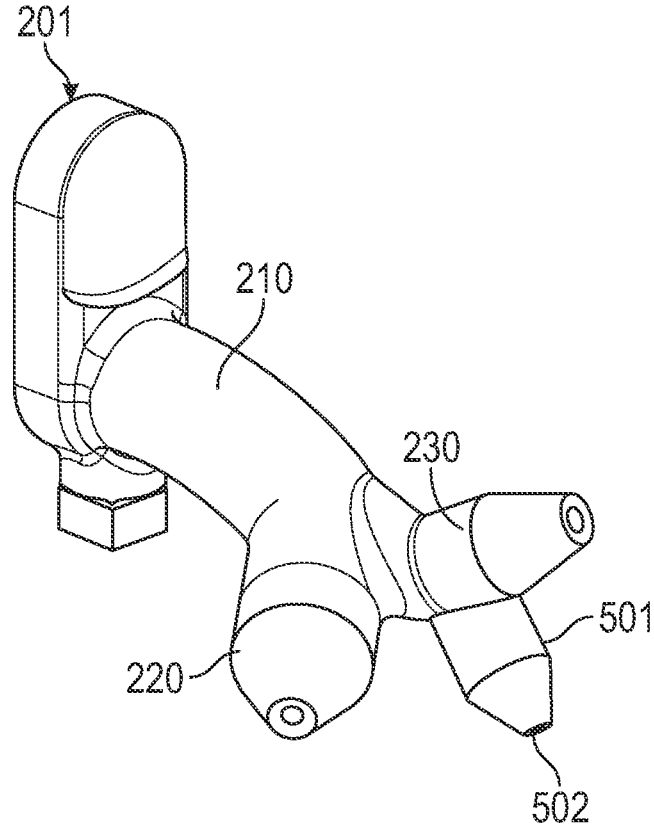
FIG. 5 is a perspective view of an oil nozzle for a bearing chamber of a gas turbine engine in accordance with further embodiments.
FIG. 6 is a flow diagram illustrating a method of additively manufacturing a bearing chamber in accordance with embodiments.

While FIGS. 2 and 3A generally illustrate a bifurcated oil nozzle, it is to be understood with reference to FIGS. 4 and 5 that the oil nozzle can be trifurcated or split into greater numbers of separate additional nozzles. For example, as shown in FIGS. 4 and 5, the oil nozzle 201 can include another additional nozzle section 401 that is split off from the main nozzle section (see FIG. 4) and/or another additional nozzle section 501 which is split off from the additional nozzle section 230 (see FIG. 5). In each of these cases, the another additional nozzle section 401/501 can be formed to include an interior channel and an aperture 402/502 generally as described above whereby fluid, such as the oil, can be flown though the interior channels and exited via the corresponding aperture 402/502 toward an additional target for cooling and lubrication.

With reference to FIG. 6, a method 600 of manufacturing a bearing chamber, such as the bearing chamber described above, is provided. The method 600 includes additively manufacturing the bearing chamber (block 601) and additively manufacturing one or more oil nozzles integrally with the bearing chamber (block 602) where the one or more oil nozzles are provided as the oil nozzle 201 described above.

Figure 7:
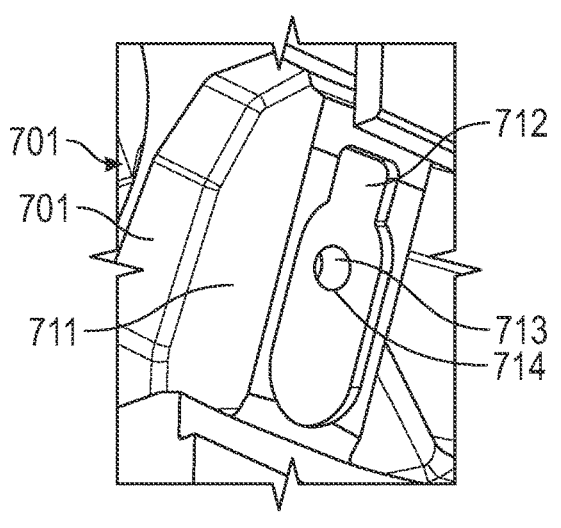
FIG. 7 is a perspective view of a bearing chamber and an interior surface of the bearing chamber with a terminal block in accordance with embodiments.
Figure 8:
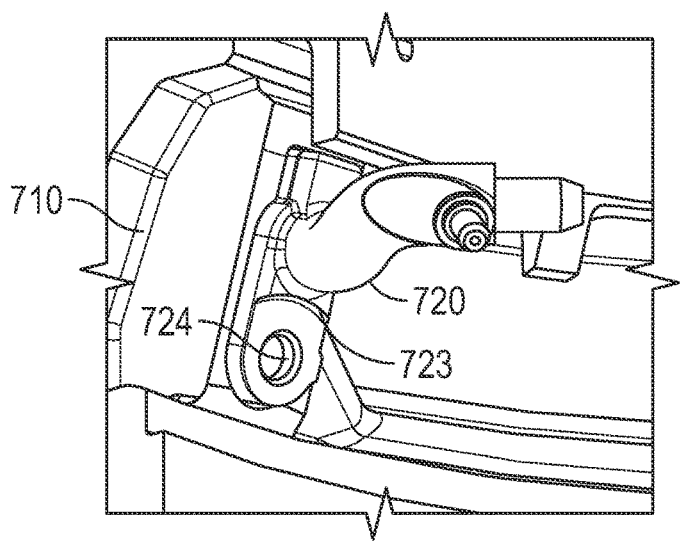
FIG. 8 is a perspective view of the bearing chamber and the interior surface of the bearing chamber with the terminal block of FIG. 7 and an oil nozzle in accordance with embodiments.
Figure 9:
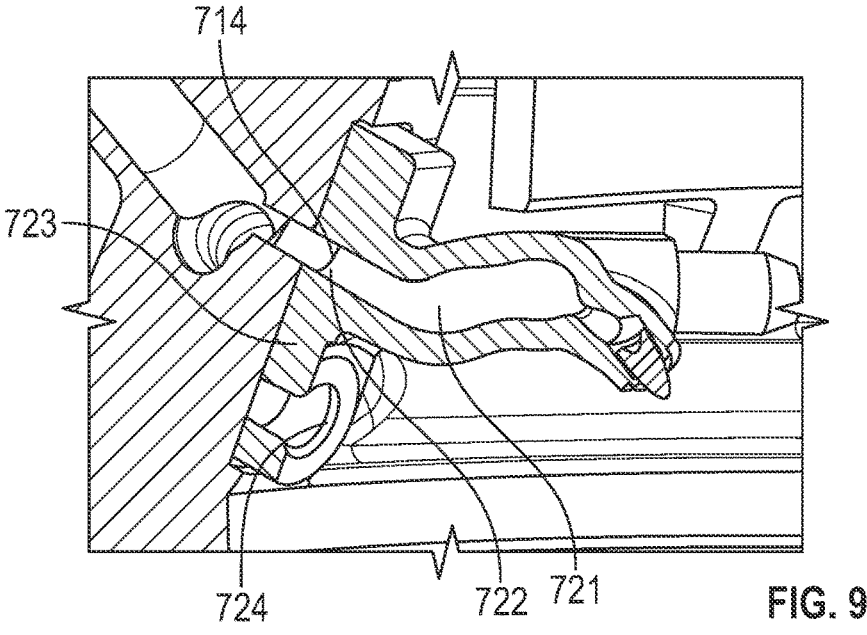
FIG. 9 is a perspective view of the bearing chamber and the interior surface of the bearing chamber with the terminal block of FIG. 7 and an inteiror of the oil nozzle of FIG. 8 in accordance with embodiments.

With reference to FIGS. 7-9, a bearing chamber 701 is provided and includes an interior surface 710, which can be additively manufactured, and an oil nozzle 720, which can also be additively manufactured. The interior surface 710 includes a terminal block 711 that is formed to define a keyway 712 and a conduit 713. The conduit 713 extends through a body of the bearing chamber 701 and terminates at a terminus 714 at the keyway 712. The oil nozzle 720 is similar to the oil nozzle described above and like details need not be described again. The oil nozzle 720 is formed to define an internal channel 721 with an opening 722 (i.e., the internal channel 211 of FIG. 3A) and includes a base 723. Both the keyway 712 and the base 723 can be elongate. In any case, the base 723 is tightly fittable in the keyway 712. The base 723 can also include a fastening point 724, at which the base 723 is fastened to the terminal block 711 at the keyway 712.

When the base 723 is tightly fit in the keyway 712 as shown in FIGS. 8 and 9, the opening 722 of the internal channel 721 sits flush against the terminus 714 of the conduit 713 whereby the internal channel 721 is fluidly communicative with the conduit 713. As such, oil or other fluids directed into and through the conduit 713 enter and flow through the internal channel 721. In addition, when the base 722 is tightly fit in the keyway 712, an orientation of the keyway 712 and a configuration of the oil nozzle 720 are cooperatively established to aim the oil nozzle 720 at one or more predefined targets within the bearing chamber 701. In this way, the orientation of the keyway 712 and the configuration of the oil nozzle 720 work cooperatively to aim a flow of oil or other fluids passing through the internal channel 721 toward the one or more predefined targets.

With reference to FIG. 10, a method of additively manufacturing a bearing chamber, such as the bearing chamber 701 of FIGS. 7-9, is provided. The method includes additively manufacturing an interior surface of the bearing chamber to include a terminal block defining a keyway and a conduit terminating at the keyway (block 1001) and forming an oil nozzle defining an internal channel and including a base (block 1002). The method further includes tightly fitting the base in the keyway such that the internal channel is fluidly communicative with the conduit (block 1003) and establishing an orientation of the keyway and a configuration of the oil nozzle to aim the oil nozzle at one or more predefined targets within the bearing chamber (block 1004).

In accordance with embodiments, in block 1004, the establishing of the orientation of the keyway can be set first and the configuration of the oil nozzle can be based on the orientating of the keyway or the establishing of the the configuration of the oil nozzle can be set first and the orientation of the keyway can be based on the configuration of the oil nozzle.

Benefits of the features described herein are the provision of an oil nozzle of a gas turbine engine. The oil nozzle can be additively manufactured to be integral with a bearing chamber body and can be bifurcated with a main nozzle section and an additional nozzle section that splits off from the main nozzle section. The main and additional nozzle sections each have an aperture with grooves or rifling, they can be directed in different directions (i.e., with different attitudes, altitudes, etc.) and additional bifurcations are possible to either the main section or the additional nozzle section so as to provide for substantial oil coverage for lubrication and cooling.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bearing chamber, comprising:

an interior surface comprising a terminal block defining a keyway and a conduit terminating at the keyway; and an oil nozzle defining an internal channel and comprising a base fittable in the keyway, wherein, when the base is fit in the keyway:

the internal channel is communicative with the conduit, and an orientation of the keyway and a configuration of the oil nozzle are cooperatively established to aim the oil nozzle at a predefined target within the bearing chamber, wherein:

the terminal block has a surface from which the keyway is recessed and a recessed surface within the keyway at which the conduit terminates, and the keyway, the recessed surface and the base are each elongate with corresponding first, rounded ends and corresponding second, partially rounded and partially polygonal ends opposite the first, rounded ends.

2. The bearing chamber according to claim 1, wherein the interior surface and the terminal block are additively manufactured.

3. The bearing chamber according to claim 1, wherein the base comprises a fastening point at which the base is fastened to the terminal block at the keyway.

4. The bearing chamber according to claim 1, wherein the base sits flush against the recessed surface and an opening of the internal channel sits flush against a terminus of the conduit at the recessed surface.

5. The bearing chamber according to claim 1, wherein the oil nozzle comprises:

a main section defining the internal channel;

a main nozzle section coupled to the main section and defining a main nozzle internal channel communicative with the internal channel and an aperture at a distal end thereof; and an additional nozzle section split off from the main nozzle section and defining an additional nozzle internal channel communicative with the main nozzle internal channel and an aperture at a distal end thereof.

6. The bearing chamber according to claim 5, wherein the main nozzle section and the additional nozzle section point in different directions.

7. The bearing chamber according to claim 5, wherein at least one of the main nozzle section and the additional nozzle section comprises grooves at the corresponding aperture.

8. The bearing chamber according to claim 5, wherein at least one of the main nozzle section and the additional nozzle section comprises rifling at the corresponding aperture.

9. The bearing chamber according to claim 5, wherein the main nozzle section and the additional nozzle section have different aperture configurations.

10. The bearing chamber according to claim 5, wherein a proximal end of the additional nozzle section comprises a turn.

11. The bearing chamber according to claim 5, further comprising another additional nozzle section which is split off from the main nozzle section.

12. The bearing chamber according to claim 5, further comprising another additional nozzle section which is split off from the additional nozzle section.

13. The bearing chamber according to claim 1, wherein the oil nozzle comprises:

a main section defining the internal channel;

a main nozzle section coupled to the main section and defining a main nozzle internal channel communicative with the internal channel and an aperture at a distal end thereof; and multiple additional nozzle sections, each of which is split off from the main nozzle section and each of which defines an additional nozzle internal channel communicative with the main nozzle internal channel and an aperture at a distal end thereof.

14. The bearing chamber according to claim 13, wherein the main nozzle section and each of the multiple additional nozzle sections point in different directions.

15. The bearing chamber according to claim 1, wherein the oil nozzle comprises:

a main section defining the internal channel;

a main nozzle section coupled to the main section and defining a main nozzle internal channel communicative with the internal channel and an aperture at a distal end thereof through;

an additional nozzle section split off from the main nozzle section; and another additional nozzle section split off from the additional nozzle section, each of the additional nozzle section and the another additional nozzle section defining an additional nozzle internal channel communicative with the main nozzle internal channel and an aperture at a distal end thereof.

16. The bearing chamber according to claim 15, wherein the main nozzle section, the additional nozzle section and the another additional nozzle section point in different directions.

17. A method of additively manufacturing a bearing chamber, the method comprising:

additively manufacturing an interior surface comprising a terminal block defining a keyway and a conduit terminating at the keyway;

forming an oil nozzle defining an internal channel and comprising a base;

fitting the base in the keyway such that the internal channel is communicative with the conduit; and establishing an orientation of the keyway and a configuration of the oil nozzle to aim the oil nozzle at a predefined target within the bearing chamber, wherein:

the terminal block has a surface from which the keyway is recessed and a recessed surface within the keyway at which the conduit terminates, and the keyway and the base are each elongate with corresponding first, rounded ends and corresponding second, partially rounded and partially polygonal ends opposite the first, rounded ends.

18. The method according to claim 17, wherein the establishing of the orientation of the keyway is set first and the configuration of the oil nozzle is based on the orientating of the keyway.

19. The method according to claim 17, wherein the establishing of the configuration of the oil nozzle is set first and the orientation of the keyway is based on the configuration of the oil nozzle.

* * * * *